(12) United States Patent
Payne

(10) Patent No.: US 11,877,535 B2
(45) Date of Patent: Jan. 23, 2024

(54) REMOVABLE INSERT FOR MOWER BLADE AND METHODS OF USING THE SAME

(71) Applicant: Kubota Corporation, Osaka (JP)

(72) Inventor: Kirk Payne, Lakemont, GA (US)

(73) Assignee: Kubota Corporation, Osaka (JP)

( * ) Notice: Subject to any disclaimer, the term of this patent is extended or adjusted under 35 U.S.C. 154(b) by 401 days.

(21) Appl. No.: 17/120,557

(22) Filed: Dec. 14, 2020

(65) Prior Publication Data
US 2022/0183228 A1 Jun. 16, 2022

(51) Int. Cl.
*A01D 34/73* (2006.01)

(52) U.S. Cl.
CPC .................................. *A01D 34/733* (2013.01)

(58) Field of Classification Search
CPC .... A01D 34/005; A01D 34/73; A01D 34/733; A01D 2101/00
See application file for complete search history.

(56) References Cited

U.S. PATENT DOCUMENTS

| | | | | |
|---|---|---|---|---|
| 2,786,322 A | * | 3/1957 | McEvers | A01D 34/73 30/276 |
| 3,093,952 A | * | 6/1963 | Bonser | A01D 34/73 56/255 |
| 3,321,894 A | * | 5/1967 | Ingram | A01D 34/63 56/295 |
| 3,440,808 A | * | 4/1969 | Freedlander | A01D 34/73 56/295 |
| 3,665,692 A | * | 5/1972 | Hughes | A01D 34/63 56/295 |
| 3,683,606 A | * | 8/1972 | Staines | A01D 34/733 56/295 |
| 3,949,541 A | * | 4/1976 | Henry | A01D 34/73 56/295 |
| 4,229,933 A | * | 10/1980 | Bernard | A01D 34/733 56/295 |
| 4,445,315 A | * | 5/1984 | Roszkowski | A01D 75/20 409/134 |

(Continued)

FOREIGN PATENT DOCUMENTS

| | | | | | |
|---|---|---|---|---|---|
| KR | 20130040442 A | * | 4/2013 | ........... | A01D 34/416 |
| KR | 20200016032 A | * | 2/2020 | ........... | A01D 34/733 |

(Continued)

*Primary Examiner* — Adam J Behrens
(74) *Attorney, Agent, or Firm* — Hovey Williams LLP; Kameron D. Kelly

(57) ABSTRACT

A mower blade assembly, a mower including such an assembly, and methods of replacing a blade insert of the mower blade assembly are disclosed. The mower blade assembly includes a main body and a blade insert removably attachable to the main body between an operable position and a removed position. One of the main body and the blade insert includes a mounting tab and the other of the main body and the blade insert includes a mounting pocket sized and shaped to receive the mounting tab when the blade insert is in the operable position. The mounting pocket includes an opening being defined by a closed perimeter provided in an end face of the other of the main body and the blade insert. The method includes slidably coupling the blade insert to the main body of the mower blade, and removably securing the blade insert to the main body.

20 Claims, 7 Drawing Sheets

(56) References Cited

U.S. PATENT DOCUMENTS

| | | | | |
|---|---|---|---|---|
| 4,471,603 | A | * | 9/1984 | Veltin, Jr. .............. A01D 34/733 56/295 |
| 4,651,510 | A | * | 3/1987 | Malutich .............. A01D 34/733 D15/17 |
| 4,779,407 | A | * | 10/1988 | Pattee .................... A01D 34/73 56/295 |
| 4,815,264 | A | * | 3/1989 | Mijnders .............. A01D 34/736 56/13.6 |
| 5,018,347 | A | * | 5/1991 | Feilen .................. A01D 34/733 30/337 |
| 5,019,113 | A | * | 5/1991 | Burnell ................ A01D 34/733 56/DIG. 17 |
| 5,036,654 | A | * | 8/1991 | Malutich .............. A01D 34/733 56/255 |
| 5,103,882 | A | * | 4/1992 | Milbourn ................ B23D 61/04 144/34.1 |
| 5,383,329 | A | * | 1/1995 | Cornell, III ............ A01D 34/73 56/255 |
| 5,791,131 | A | * | 8/1998 | Hill ...................... A01D 34/733 56/DIG. 9 |
| 6,182,430 | B1 | * | 2/2001 | Blarek .................... A01D 34/73 56/DIG. 17 |
| 6,935,095 | B1 | * | 8/2005 | Sluder .................. A01D 34/733 56/DIG. 17 |
| 8,099,937 | B2 | * | 1/2012 | Lindmeyer .......... B26D 7/2614 56/255 |
| 8,935,909 | B2 | * | 1/2015 | Eavenson, Sr. ........ A01D 34/73 56/289 |
| 9,113,594 | B1 | * | 8/2015 | Delmont .............. A01D 34/733 |
| 9,338,942 | B2 | * | 5/2016 | Eavenson, Sr. ........ A01D 34/73 |
| 9,743,584 | B1 | | 8/2017 | Dixon |
| 9,901,029 | B2 | * | 2/2018 | Wills .................... A01D 34/733 |
| 9,924,632 | B2 | | 3/2018 | Chenevert et al. |
| 10,517,212 | B2 | | 12/2019 | Haun |
| 10,849,269 | B1 | * | 12/2020 | Dixon .................... A01D 34/66 |
| 11,716,929 | B2 | * | 8/2023 | Matsuzawa .......... A01D 34/733 56/255 |
| 2003/0182918 | A1 | * | 10/2003 | Stone .................... A01D 34/73 56/255 |
| 2006/0156706 | A1 | * | 7/2006 | Eavenson ............ A01D 34/733 56/17.5 |
| 2006/0168933 | A1 | * | 8/2006 | Hill ........................ A01D 34/73 56/295 |
| 2008/0277127 | A1 | * | 11/2008 | Dixon .................. A01D 34/733 172/552 |
| 2012/0110970 | A1 | * | 5/2012 | Blarek .................... A01D 34/73 56/295 |
| 2013/0327007 | A1 | * | 12/2013 | Eavenson, Sr. ........ A01D 34/73 56/295 |
| 2014/0109411 | A1 | * | 4/2014 | Arnetoli ................ A01D 34/733 30/123 |
| 2017/0118911 | A1 | * | 5/2017 | Jerez .................... A01D 34/733 |
| 2018/0235138 | A1 | * | 8/2018 | Bulizuik ................ A01B 15/18 |
| 2019/0045707 | A1 | * | 2/2019 | Patridge ................ A01D 34/66 |
| 2020/0008349 | A1 | * | 1/2020 | Bollman .......... A01D 34/736 |

FOREIGN PATENT DOCUMENTS

| | | | | |
|---|---|---|---|---|
| WO | WO-2010134462 | A1 | * | 11/2010 ........... A01D 34/733 |
| WO | WO-2013049316 | A2 | * | 4/2013 ............. A01D 34/64 |

* cited by examiner

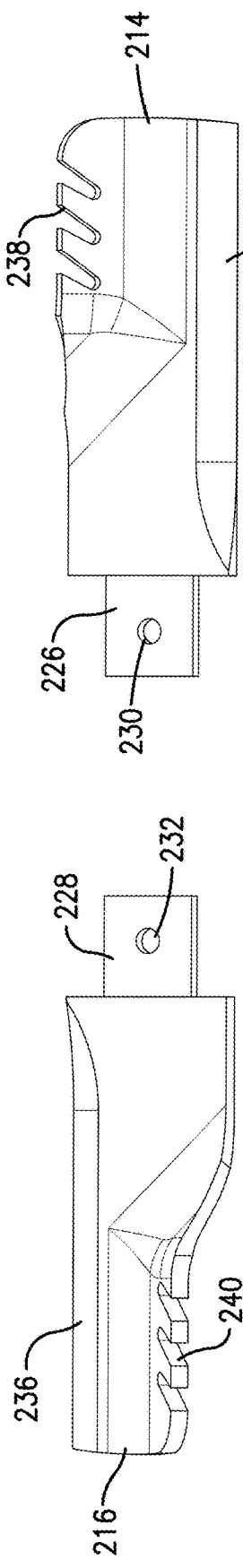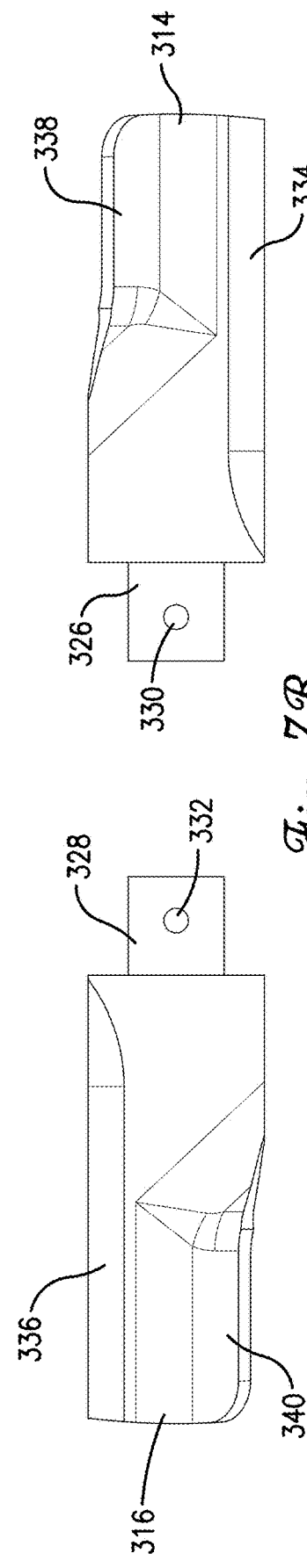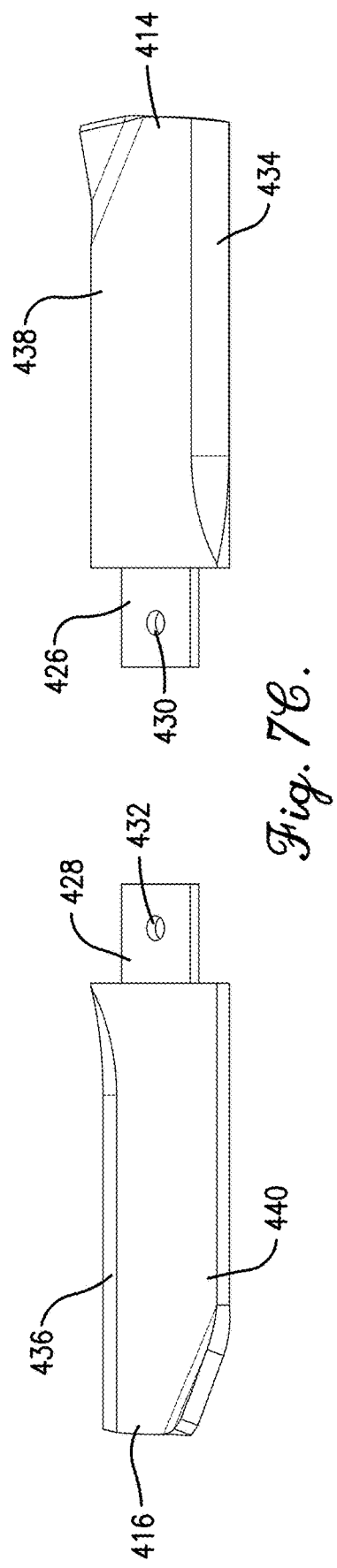

REMOVABLE INSERT FOR MOWER BLADE AND METHODS OF USING THE SAME

BACKGROUND OF THE INVENTION

Many mowers and other cutters—including walk-behind lawn mowers, zero-turn and other riding mowers, brush cutters and other tractor implements, and others—include one or more rotating blades. Each blade typically includes a pair of sharpened and/or serrated cutting surfaces that cut the grass and other vegetation as the rotating blade is passed along a field or yard.

Over time, these cutting surfaces become dull and thus need periodic sharpening. Moreover, if the blade strikes a rock or other hard obstacle during use, the blade may become damaged and thus require replacement. In order to remove the blade for sharpening, replacement, or otherwise, a user must remove the entire blade from a rotating shaft of the mower and then reattach the sharpened or replacement blade to the rotating shaft. Because the blades are coupled to the rotating shaft using large diameter bolts or other fasteners, this requires large tools and torque to dislodge and refasten. Moreover, particularly for larger commercial mowers or large tractor implements, the blades are relatively heavy and cumbersome. Thus, removal and replacement of the blades can be difficult, particularly for one individual to do so by themselves.

There thus remains a need for an improved blade for a mower or other cutter that simplifies the process for sharpening and replacing the cutting surfaces of the blades. More particularly, there remains a need for an improved blade that enables a single individual to repair, sharpen, or replace the blade without having to remove and replace large diameter bolts each time, and without requiring an individual to align and hold the bulky and heavy blade in place during a mounting process.

BRIEF SUMMARY OF THE INVENTION

Some embodiments of the invention are directed to a mower blade assembly. The mower blade assembly includes a main body configured to be removably coupled to a rotating shaft of a mower, and a blade insert removably attachable to the main body between an operable position and a removed position. One of the main body and the blade insert includes a mounting tab and the other of the main body and the blade insert includes a mounting pocket sized and shaped to receive the mounting tab when the blade insert is in the operable position. The mounting pocket includes an opening provided in an end face of the other of the main body and the blade insert for receiving the mounting tab, with the opening being defined by a closed perimeter provided in the end face of the other of the main body and the blade insert.

Other embodiments of the invention are directed to a mower. The mower includes a mower deck including a rotating shaft rotatably coupled to the mower deck, and a mower blade assembly such as the mower blade assembly discussed above. In such embodiments, the main body is removably coupled to the rotating shaft of the mower deck.

Still other embodiments of the invention are directed to a method of replacing a blade insert of a mower blade. The method includes slidably coupling the blade insert to a main body of the mower blade, wherein one of the main body and the blade insert includes a mounting tab and the other of the main body and the blade insert includes a mounting pocket sized and shaped to receive the mounting tab, and wherein slidably coupling the blade insert to the main body includes sliding the mounting tab through an opening provided in an end face of the other of the main body and the blade insert and receiving the mounting tab in the mounting pocket, the opening being defined by a closed perimeter provided in the end face of the other of the main body and the blade insert. The method also includes removably securing the blade insert to the main body.

These and other features will be discussed in more detail below in connection with the accompanying drawings.

BRIEF DESCRIPTION OF THE DRAWINGS

The present invention is described in detail below with reference to the attached drawing figures, wherein:

FIGS. 7A-7C are perspective views of various blade inserts according to other embodiments of the invention.

DETAILED DESCRIPTION OF THE INVENTION

Generally, aspects of the invention are directed to an improved mower blade assembly that simplifies removal and replacement of a cutting portion of the mower blade assembly. The improved mower blade assembly includes one or more replaceable blade inserts that can be removed and replaced, without removing the entire mower blade assembly from a mower deck or other cutting machine. The user can thus sharpen or replace worn cutting edges as well as use different types of cutting inserts tailored to a specific cutting application without removing and replacing the entire blade assembly from the mower or other cutter. The mower blade assembly may include a mounting tab and correspondingly sized and shaped mounting pocket to easily mate and secure the blade insert in an operable position. A bolt or other fastener is used to secure the blade insert in the operable position, which is smaller (and thus requires less torque) than a main bolt or fastener that attaches the blade to a rotating shaft of the mower or other cutter. The mounting tab and corresponding mounting pocket can hold the blade insert in place during a mounting process, thus freeing a user's hands when removing or replacing the small fastener.

Figure 1:
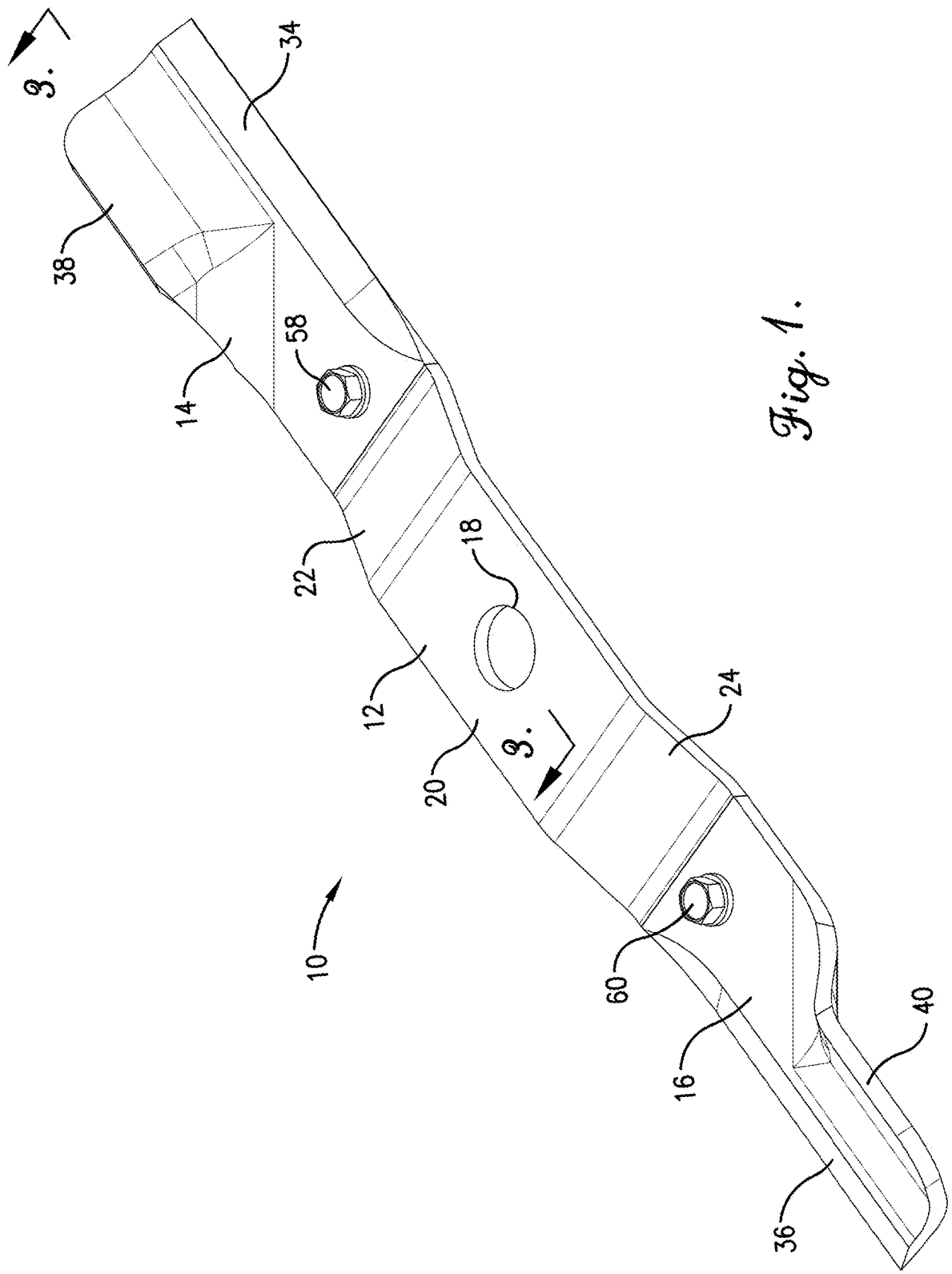
FIG. 1 is a perspective view of a mower blade assembly according to a first embodiment of the invention and including a pair of blade inserts thereof shown in an operable position.
Figure 2:
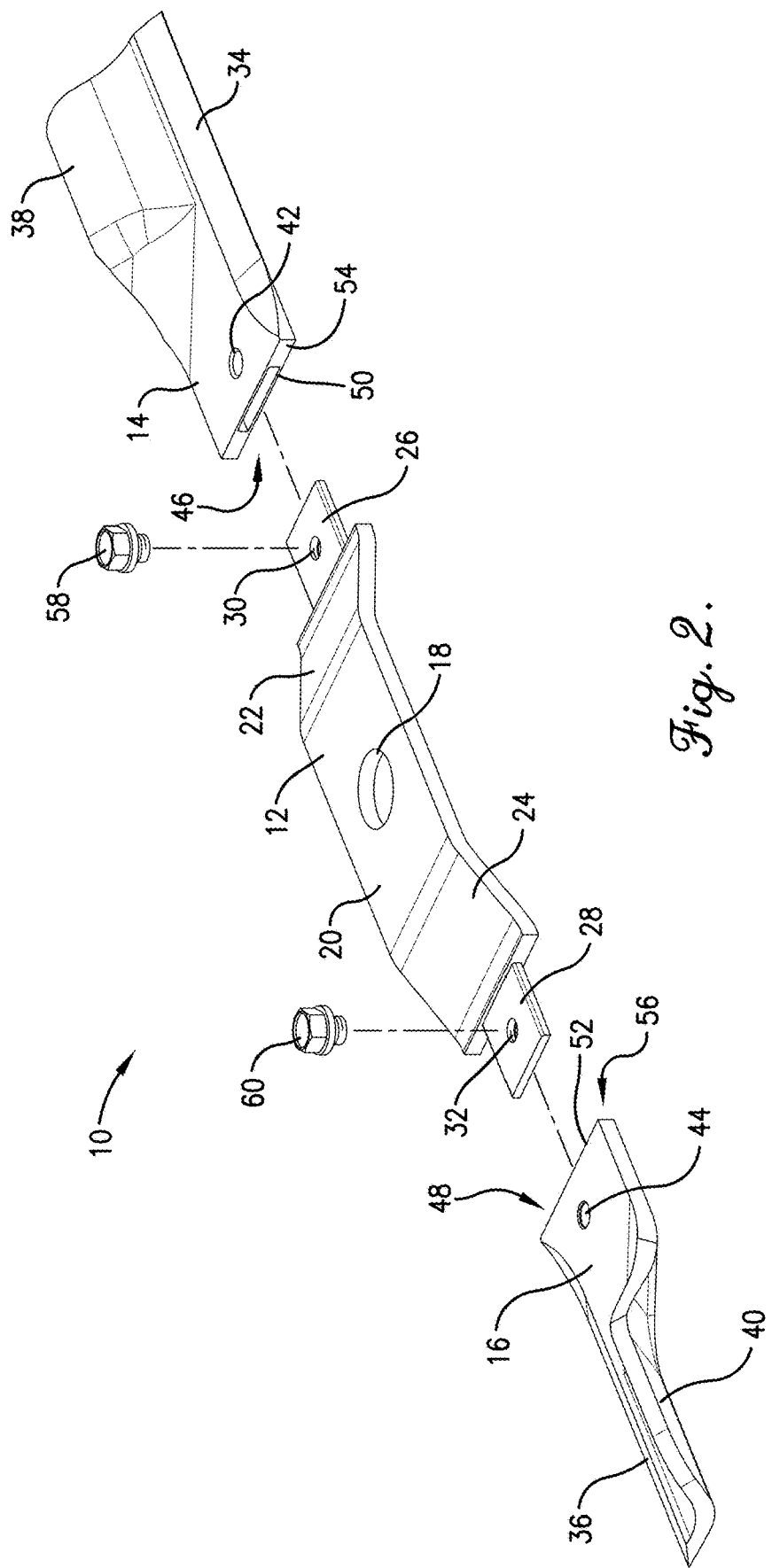
FIG. 2 is another perspective view of the mower blade assembly shown in FIG. 1 and including the pair of blade inserts shown in a removed position.

These and other features will be more readily apparent with reference to the figures. First, FIGS. 1 and 2 show a mower blade assembly 10 including a pair of blade inserts 14, 16 shown in an operable position and a removed position, respectively. The mower blade assembly 10 includes a main body 12 with the pair of blade inserts 14, 16 attachable to (FIG. 1) and removable from (FIG. 2) respective distal ends of the main body 12. A mounting hole or bore 18 is provided at a center of the main body 12 that is configured to receive a main fastener or mounting bolt when the mower blade assembly 10 is removably coupled to a rotating shaft of a mower or other cutter, as will be discussed more fully in connection with FIG. 6.

In the depicted embodiment, the main body 12 includes a flared configuration. That is, the main body 12 includes a substantially planar portion 20 including the center mounting hole 18, and a pair of ramped portions 22, 24 flared away from—i.e., extending away at an oblique angle from—the planar portion 20. In other embodiments, however, the main body may take another shape without departing from the scope of the invention. For example, in some embodiments the entirety of the main body 12 may be substantially planar without departing from the scope of the invention.

Each distal end of the two ramped portions 22, 24 culminates in a respective mounting tab 26, 28. The mounting tabs 26, 28 are substantially planar and extend substantially parallel the planar portion 20 and thus at an oblique angle with respect to the respective ramped portions 22, 24. Each of the mounting tabs 26, 28 includes a respective fastener opening 30, 32. The fastener openings 30, 32 are sized and configured to receive respective fasteners 58, 60 when the inserts 14, 16 are in the operable position. In that regard, when the fasteners 58, 60 are threaded fasteners, the fastener openings 30, 32 may be correspondingly tapped or threaded holes configured to receive the threaded fasteners.

Each blade insert 14, 16 may include a sharpened edge 34, 36 and an opposing flared or other-shaped trailing edge 38, 40. The sharpened edge 34, 36 of each blade insert 14, 16 comes into contact with grass or other vegetation during use thereby severing the top of the grass or other vegetation as the spinning blade assembly 10 is moved along a yard or field. The trailing edge 38, 40 may be ramped, curved, flared, or otherwise configured depending on the particular application. For example, in the depicted embodiment the mower blade assembly 10 is a "high lift" or similar blade configured to create an upward suction as the blade assembly 10 spins, which lifts the cut vegetation and flings the clippings either to a discharge of a mower deck or to a hopper of a mower. Accordingly, the trailing edge 38, 40 include a relatively severe flared edge in order to create the desired upward suction.

In other embodiments, the blade assembly 10 may be otherwise configured. For example, in some embodiments the blade assembly 10 may be a mulching blade that include opposing edges 38, 40 curved or otherwise formed in a manner such that the grass and other vegetation clippings are lifted, circulated, and repeatedly pulverized by the spinning mower blade assembly 10, mulching the clippings before returning them to yard or field. In still other embodiments the opposing edges 38, 40 may include a more- or less-severe curved or flared portion or other configuration depending on the particular application, which will be discussed more fully below in connection with FIGS. 7A-7C.

Each blade insert 14, 16 includes an internal pocket 46, 48 sized and shaped to receive a corresponding one of the mounting tabs 26, 28 when the blade inserts 14, 16 are in the operable position. The pockets 46, 48 are provided at a mounting interface between the inserts 14, 16 and the main body 12, and each include an opening 50, 52 provided in a respective end face 54, 56 of the blade insert 14, 16. Each opening 50, 52 is defined by a closed perimeter provided in the respective end face 54, 56 of the blade insert 14, 16. In the embodiment shown in FIGS. 1 and 2, the closed perimeters of the openings 50, 52 are substantially rectangular, but in other embodiments the closed perimeter can take any suitable shaped without departing from the scope of the invention. For example, the closed perimeter could be substantially oval or may include an irregular shape to accommodate an orientation key provided on the mounting tab, as will be discussed more fully in connection with FIG. 5, among other configurations and shapes.

Each blade insert 14, 16 also includes a through hole 42, 44 sized and shaped to receive the corresponding fastener 58, 60 when the blade inserts 14, 16 are in the operable position. The through holes 42, 44 are provided in a respective upper surface of the blade inserts 14, 16 and are in communication with the respective mounting pocket 46, 48 of the blade insert 14, 16. More particularly, when the blade inserts 14, 16 are in the operable position (FIG. 1), each mounting tab 26, 28 is received within a respective pocket 46, 48 with the through holes 42, 44 of each insert 14, 16 being axially aligned with the fastener openings 30, 32 of the mounting tabs 26, 28.

Figure 3:
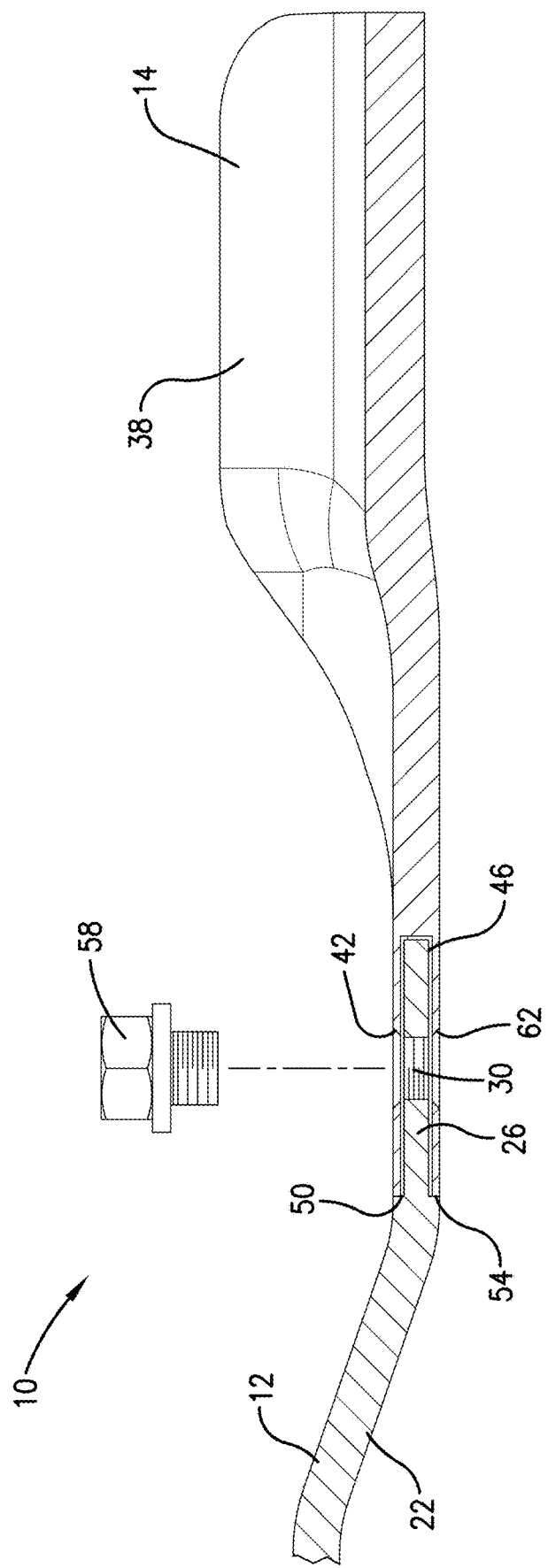
FIG. 3 is a cross-sectional view of a portion of the mower blade assembly shown in FIGS. 1-2 as viewed along line 3-3 in FIG. 1.

This may be more readily understood with reference to FIG. 3, which is a partial cross-sectional view of the mower blade assembly 10 as viewed along line 3-3 in FIG. 1, but with the fastener 58 shown in a removed position for clarity. Moreover, for simplicity the mounting interface of only one of the blade inserts 14 is shown in cross-section, but it should be appreciated that the mounting interface of the other, substantially similarly configured blade insert 16, would look the same in cross-section. As can be seen, in the operable position the blade insert 14, and more particularly the mounting pocket 46 of the blade insert 14, is slid onto the mounting tab 26 of the main body until the end face 54 of the insert 14 abuts a corresponding face of the main body 12. At this position, the mounting tab 26 is fully received within the mounting pocket 46 and the through hole 42 of the blade insert 14 is axially aligned with the fastener opening 30 of the mounting tab 26. In some embodiments, the blade insert 14 can include another through hole 62 provided in a lower surface of the blade insert 14, which is axially aligned with the through hole 42 and in communication with the mounting pocket 46. In such embodiments, the other through hole 62 will be axially aligned with the through hole 42 and the fastener opening 30 when the blade insert 14 is in the operable position.

Figure 4:
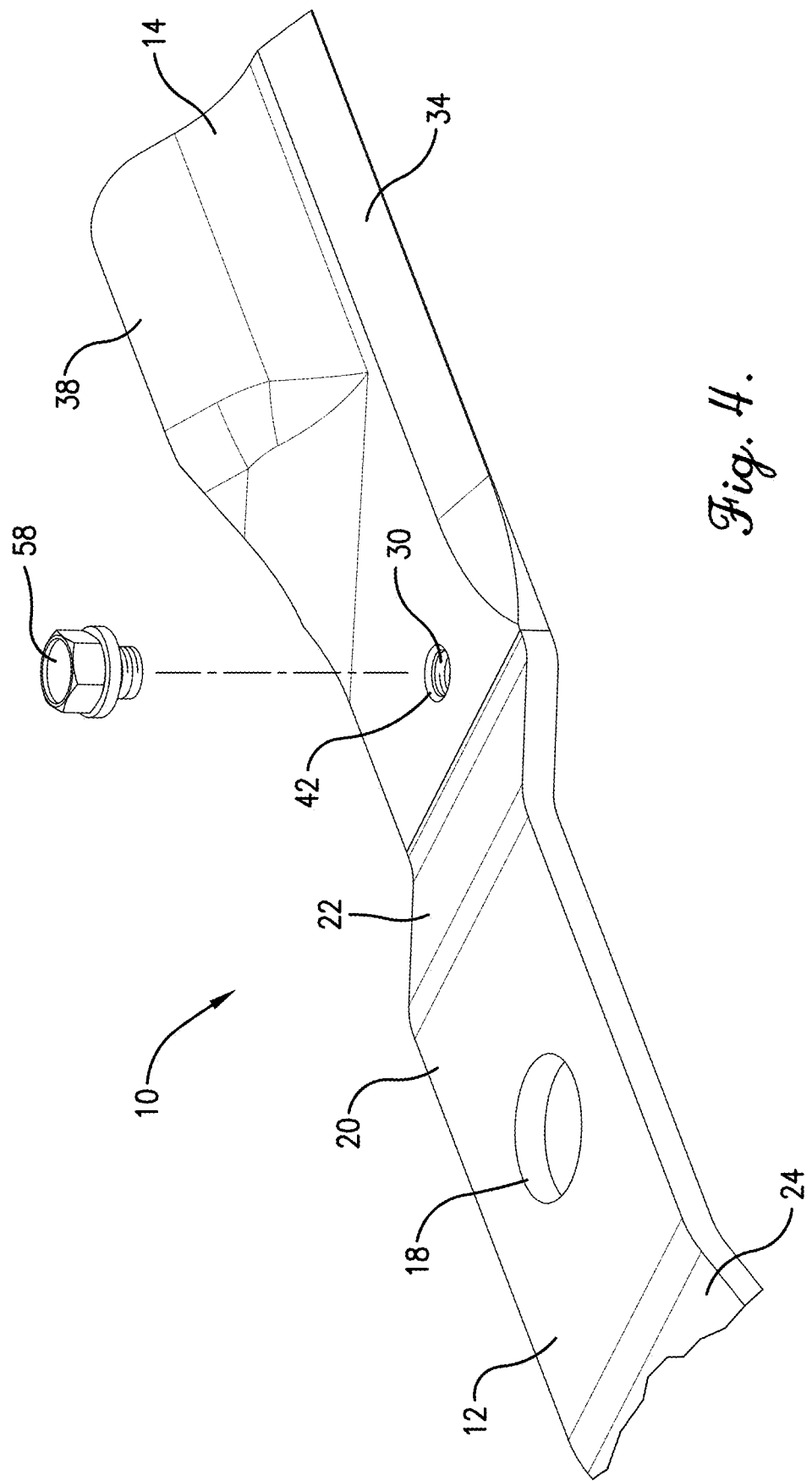
FIG. 4 is partial perspective view of the mower blade assembly shown in FIGS. 1-3 including the blade insert shown in an operable position and a fastener thereof shown in a removed position.

In this regard, the through hole 42, the fastener opening 30, and optionally the other through hole 62 are configured to receive a correspondingly sized and shaped fastener 58 when the blade insert 14 is in the operable position, as depicted in FIGS. 3 and 4. The fastener 58 may be a threaded bolt, such as, in one non-limiting example, an M10 bolt, and one or more of the through holes 42, 62 and the fastener opening 30 may be tapped or threaded to receive the threaded bolt. For example, in some embodiments the through holes 42, 62 do not include threads but the fastener opening 30 does. Accordingly, to secure the blade insert 14 in the operable position, the fastener 58 is extended through the through hole 42 and threaded into the fastener opening 30. In embodiments including the second through hole 62, the bolt may be sized to extend beyond the mounting tab 26 when fully tightened down such that the fastener 58 at least partially extends into the second through hole 62. In other embodiments, one or both of the through holes 42, 62 may be threaded instead of or in addition to the fastener hole 30. In any event, when the fastener 58 is tightened down into the fastener hole 30, the through hole 42, and/or the other through hole 62, the fastener 58 prevents the blade insert 14 from sliding away from the main body 12, thus securing the blade insert 14 to the main body 12.

As best seen in FIG. 3, the mounting tabs 26, 28 and pockets 46, 48 are symmetrical, and thus the blade inserts 14, 16 can potentially be mounted both in the orientation shown in FIGS. 1-3, and in a mirror-image orientation in which the blade inserts are rotated 180-degrees from the orientation shown in FIGS. 1-3. This may be desirable from a design standpoint, such as when the blade inserts are symmetrical and/or reversable. However, when it is desirable to prevent such both mounting configurations, such as if the blade inserts are not symmetrical or reversible and otherwise are inoperable when rotated 180-degrees, the mounting tab may include an orientation key that ensure the blade insert is mountable only in one, correct orientation.

Figure 5:
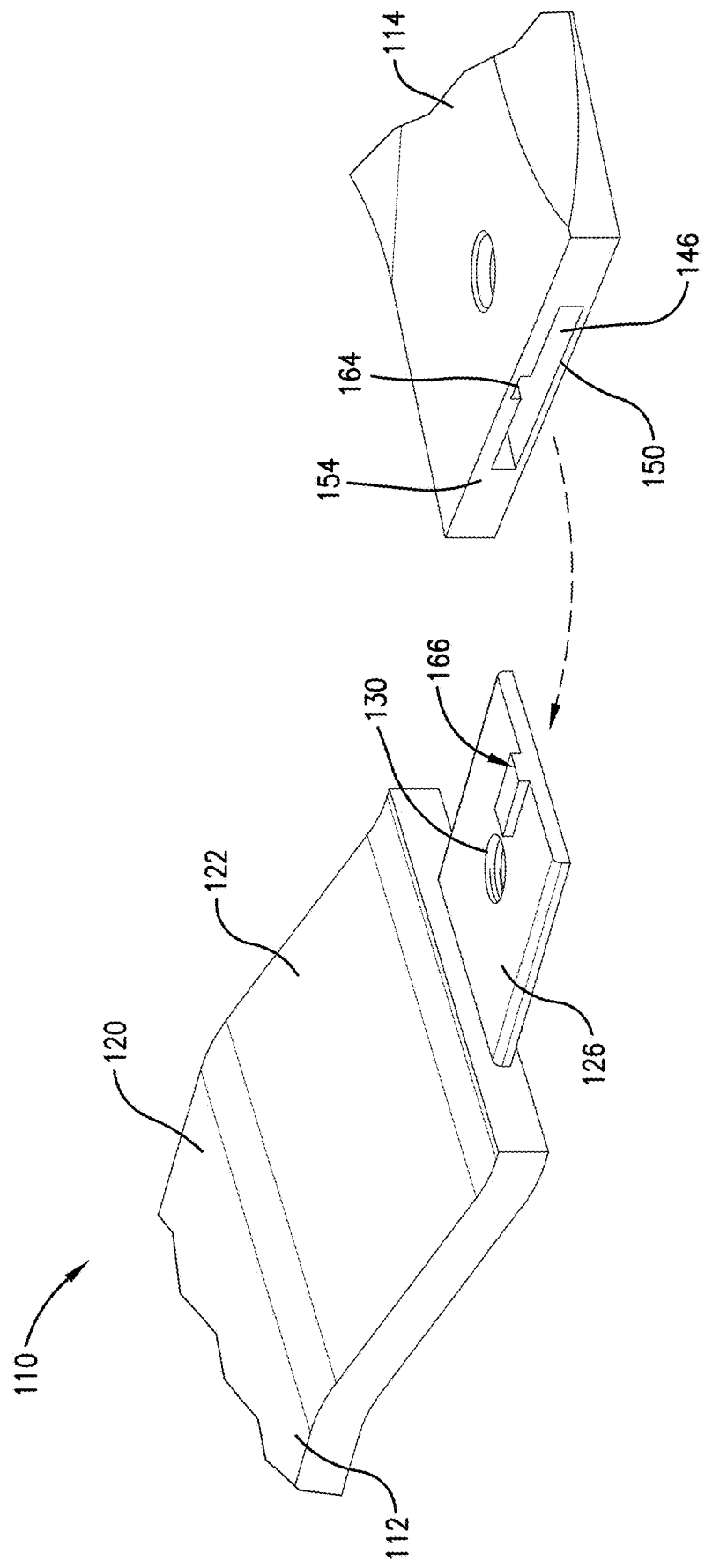
FIG. 5 is a partial perspective view of a mower blade assembly according to another embodiment of the invention.

FIG. 5 shows one non-limiting example of such an orientation key 166. More particularly, FIG. 5 shows a mower blade assembly 110 according to another embodiment of the invention. As with the mower blade assembly 10 discussed above, the mower blade assembly 110 includes a main body 112 and one or more blade inserts 114. For simplicity, only one blade insert 114 is shown in FIG. 5, but it should be appreciated that the mower blade assembly 110 could have more than one blade insert, as discussed above. The main body 112 includes a planar portion 120 and a first ramped portion 122 with a mounting tab 126 provided at a distal end thereof and including a fastener opening 130 provided in the tab 126. The main body 112 may also include a second ramped portion with mounting tab and fastener opening (not shown). Each of these features is similar in configuration and function to the like-named components of the mower blade assembly 10, and thus will not be discussed in detail.

In this embodiment the mounting tab 126 includes an orientation key 166. The orientation key may be a stud, post, boss, or other irregular or extruded portion extending away from the main portion of the mounting tab 126. The blade insert 114, in turn, includes a pocket 146 including a correspondingly sized and shaped opening 150 provided in an end face 154 of the blade insert 114. As with the opening 50, the opening 150 is defined by a closed perimeter provided in the end face 154 of the blade insert 114. However, the opening 150 differs from the opening 50 in that it is not symmetrical in the vertical direction. Instead, the opening 150 (and thus the pocket 146) includes a notch 164 provided at the upper side of the opening 150 that is sized and shaped to receive the orientation key 166.

When the blade insert 114 (and, more particularly, the pocket 146 thereof) is slid onto the mounting tab 126, the orientation key 166 will be received within the notch 164. Notably, if a user inadvertently attempts to slide the blade insert 114 onto the mounting tab 126 upside down, the orientation key 166 will strike the end face 154 thus preventing the blade insert 114 from sliding onto the mounting tab 126. This alerts the user that the blade insert 114 is upside down, and thus the user will rotate the blade insert 114 180-degrees so that the orientation key 166 is received within the notch 164 and thus the blade insert 114 can be fully inserted to the operable position.

Although the embodiments of the mower blade assemblies 10, 110 have been shown and described with the mounting tabs 26, 28, 126 provided on the main bodies 12, 112 and the mounting pockets 46, 48, 146 provided on the blade inserts 14, 16, 114, in other embodiments the tabs and pockets could be swapped such that the mounting tabs would be provided on the blade inserts (as shown in FIGS. 7A-7C, discussed more fully below) and with the mounting pockets provided on the main bodies of the blade assemblies. It should be appreciated given the benefit of this disclosure that in such embodiments the operation of the mower blade assemblies would be substantially similar and the benefits described herein would be similarly realized, and thus these alternative arrangements will not be discussed in detail.

Figure 6:
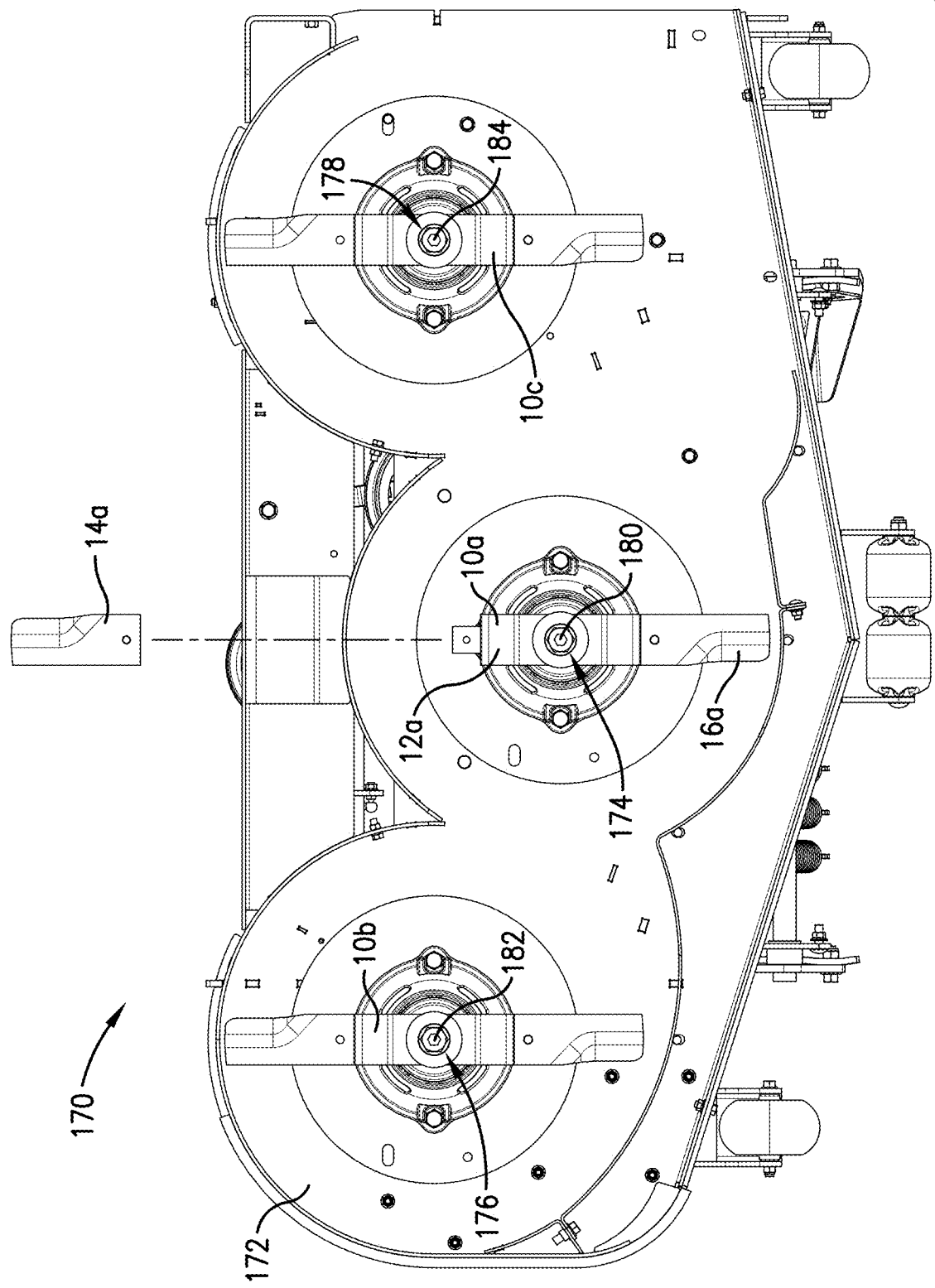
FIG. 6 is a bottom view of a mower assembly including multiple mower blade assemblies according to aspects of the invention.

The mower blade assemblies 10, 110 described herein beneficially allow for a user to remove and replace the blade inserts 14, 16, 114 without requiring the user to remove the entire mower blade assembly 10, 110 from a mower or the like and/or without requiring an entire blade assembly 10, 110 to be replaced when a cutting edge needs sharpened or has become damaged or when a different cutting edge is desired according to the particular application. For example, FIG. 6 shows a mower assembly 170 including three mower blade assemblies 10a, 10b, 10c according to aspects of the invention. Although for simplicity the mower assembly 170 will be described in connection with mower blade assemblies 10a, 10b, 10c, it should be appreciated that any embodiment of a mower blade assembly (such as mower blade assembly 110 or otherwise) described and contemplated herein could be employed on the mower assembly 170 without departing from the scope of the invention.

The mower assembly 170 generally includes a mower deck 172 including three rotating shafts 174, 176, 178 configured to be removably coupled to a respective mower blade assembly 10a, 10b, 10c and thus spin the respective mower blade assembly 10a, 10b, 10c during use. The mower assembly 170 may include other features without departing from the scope of the invention including one or more engines, seats, controls, power take-out shafts, hoppers, fuel tanks, and other components which have been omitted from FIG. 6 for simplicity.

Each mower blade assembly 10a, 10b, 10c is operably coupled to the respective rotating shaft 174, 176, 178 via a mounting bolt 180, 182, 184 or other suitable fastener or attachment mechanism. Again, the mounting bolt 180, 182, 184 extends through the central mounting hole 18 of the respective mower blade assembly 10a, 10b, 10c and is tightened into a threaded bore provided within the respective rotating shaft 174, 176, 178. These large diameter mounting bolts 180, 182, 184 require large torques to properly seat the mower blade assemblies 10a, 10b, 10c to the mower deck 172.

When a cutting edge of one of the mower blade assemblies 10a, 10b, 10c needs to be sharpened or has become damaged and needs replaced, the corresponding blade insert is simply removed and replaced, rather than requiring removal of the large diameter mounting bolts 180, 182, 184 and replacement of the entire mower blade. For example, in the depicted embodiment the blade insert 14a has been removed from the mower blade assembly 10a, while all remaining blade inserts are left in place. In this regard, a user can easily sharpen, repair, or replace the blade insert 14a by simply removing a smaller diameter bolt (fastener 58, which in one non-limiting example is an M10 bolt) that requires less torque to dislodge.

Moreover, repair or replacement of the blade insert 14a is much cheaper and efficient than repair or replacement of an entire mower blade. Still more, the ability to repair and replace the blade insert 14a individually eliminates the need for a user to handle a bulky and cumbersome blade, instead only requiring the user to lift the relatively small blade insert 14a into place. Still more, the mating pocket 46 and mounting tab 26 allows a user to slip the blade insert 14a onto the main body 12 where it is held in place with the through holes 42, 62 and fastener holes 30 being axially aligned while the user replaces the fastener 58, freeing up the user's hands during this process. This is in contrast to replacement of a mower blade in its entirety, where a user must align and hold the blade in place while simultaneously attempting to insert a corresponding mounting bolt 180, 182, 184.

Still more, the removable blade inserts 14, 16 provide the user with flexibility in choosing an appropriate cutting edge and blade type according to the specific cutting application. That is, many different blade types are available such as, without limitation, high lift blades, low lift blades, mulching blades, standard or straight blades, serrated blades, gator blades, and other blades. Using embodiments of the invention, a user can simply remove a blade insert and replace it with a differently configured insert when it is desirable to do so. This will be more readily understood with reference to FIGS. 7A-7C.

FIGS. 7A-7C show exemplary embodiments of blade inserts 214, 216, 314, 316, 414, 416 that can be employed on embodiments of the mower blade assemblies discussed herein. In this embodiment the blade inserts 214, 216, 314, 316, 414, 416 each include mounting tabs 226, 228, 326, 328, 426, 428 (including fastener openings 230, 232, 330, 332, 430, 432) that are sized and configured to be received within a corresponding mounting pocket that, in these embodiments, would be provided on a main body of the mower blade assembly. However, in other embodiments the blade inserts 214, 216, 314, 316, 414, 416 could alternatively include an internal mounting pocket (similar to the blade inserts 14, 16, 114 discussed above) with the mounting tab instead being provided on the main body (similar to the main bodies 12, 112 discussed above).

The first blade inserts 214, 216 shown in FIG. 7A are gator blade inserts, and thus each include sharpened edges 234, 236 and gator-toothed trailing edges 238, 240. Such blade inserts 214, 216 may be useful when it is desirable to return grass or other vegetation clippings to the lawn or field in order to redistribute nutrients to the surface, because the gator-toothed trailing edges 238, 240 create upward suction while providing increased cutting surfaces to pulverize the clippings before returning them to ground.

The second blade inserts 314, 316 shown in FIG. 7B are high lift blade inserts, similar to the blade inserts 14, 16 discussed above. Thus, each insert 314, 316 includes a sharpened edge 334, 336 with a curved opposing edge 338, 340 configured to create upward suction to lift the clippings and expel them from the mower, through a deck discharge chute and/or into a hopper.

The third blade inserts 414, 416 shown in FIG. 7C are mulching blade inserts. These inserts 414, 416 include a sharpened edge 434, 436 and an opposing flared edge 438, 440, which are configured to create an airflow that lifts and continuously circulates the clippings, thereby mulching the clippings into small pieces, before redistributing the clippings to the ground.

Additional inserts and configurations could be employed without departing from the scope of the invention such as "standard" or straight blade inserts, low lift blade inserts, and others. In any event, due to the easily replaceable nature of the blade inserts as discussed herein, a user can selectively choose the appropriate insert for the particular cutting application and easily replace the insert by simply removing and replacing a small-diameter bolt (e.g., fastener 58 or 60, which, again, may be an M10 bolt or similar) rather than removing and replacing an entire blade.

What is claimed is:

1. A mower blade assembly comprising:
   a main body configured to be removably coupled to a rotating shaft of a mower; and
   a blade insert removably attachable to the main body between an operable position and a removed position, with the main body and blade insert presenting respective end faces with matching outer edges in the operable position,
   wherein one of the main body and the blade insert includes a mounting tab and the other of the main body and the blade insert includes a mounting pocket sized and shaped to receive the mounting tab when the blade insert is in the operable position, in which the other of the main body and the blade insert is slid onto the mounting tab until the end face of the blade insert abuts the end face of the main body and restricts further sliding beyond the operable position,
   wherein the mounting pocket includes an opening provided in the end face of the other of the main body and the blade insert for receiving the mounting tab, the opening being defined by a closed perimeter provided in the end face of the other of the main body and the blade insert.

2. The mower blade assembly of claim 1 further comprising a second blade insert removably attachable to the main body between an operable position and a removed position, wherein the main body includes a pair of distal ends extending away from a central portion that couples to the rotating shaft, wherein the blade insert is removably attachable to a first distal end of the pair of distal ends, and wherein the second blade insert is removably attachable to a second distal end of the pair of distal ends.

3. The mower blade assembly of claim 1 further comprising:
   a fastener opening provided in the mounting tab; and
   a through hole provided in the other of the main body and the blade insert and in communication with the mounting pocket.

4. The mower blade assembly of claim 3, wherein, when the blade insert is in the operable position, the fastener opening and the through hole are axially aligned.

5. The mower blade assembly of claim 4, wherein the fastener opening is a threaded opening, and further comprising a threaded fastener configured to extend through the through hole and engage the threaded opening when the blade insert is in the operable position to secure the blade insert in the operable position.

6. The mower blade assembly of claim 5 further comprising a lock washer configured to be compressed between a face of the other of the main body and the blade insert and a head of the threaded fastener when the blade insert is in the operable position.

7. The mower blade assembly of claim 1, wherein the mounting tab includes an orientation key and the mounting pocket includes a correspondingly shaped and sized notch to receive the orientation key when the blade insert is in the operable position.

8. A mower comprising:
   a mower deck including a rotating shaft rotatably coupled to the mower deck; and
   a mower blade assembly comprising:
      a main body removably coupled to the rotating shaft; and
      a blade insert removably attachable to the main body between an operable position and a removed position, with the main body and blade insert presenting respective end faces with matching outer edges in the operable position, wherein one of the main body and the blade insert includes a mounting tab and the other of the main body and the blade insert includes a mounting pocket sized and shaped to receive the mounting tab when the blade insert is in the operable position, in which the other of the main body and the blade insert is slid onto the mounting tab until the end face of the blade insert abuts the end face of the main body and restricts further sliding beyond the operable position, wherein the mounting pocket includes an opening provided in the end face of the other of the main body and the blade insert for receiving the mounting tab, the opening being defined by a closed perimeter provided in the end face of the other of the main body and the blade insert.

9. The mower of claim 8, wherein the mower blade assembly further comprises a second blade insert removably attachable to the main body between an operable position and a removed position, wherein the main body includes a pair of distal ends extending away from a central portion that couples to the rotating shaft, wherein the blade insert is removably attachable to a first distal end of the pair of distal ends, and wherein the second blade insert is removably attachable to a second distal end of the pair of distal ends.

10. The mower of claim 8, wherein the mower blade assembly further comprises:
  a fastener opening provided in the mounting tab; and
  a through hole provided in the other of the main body and the blade insert and in communication with the mounting pocket.

11. The mower of claim 10, wherein, when the blade insert is in the operable position, the fastener opening and the through hole are axially aligned.

12. The mower of claim 11, wherein the fastener opening is a threaded opening, and wherein the mower blade assembly further comprises a threaded fastener configured to extend through the through hole and engage the threaded opening when the blade insert is in the operable position to secure the blade insert in the operable position.

13. The mower of claim 12, wherein the mower blade assembly further comprises a lock washer configured to be compressed between a face of the other of the main body and the blade insert and a head of the threaded fastener when the blade insert is in the operable position.

14. The mower of claim 12, wherein the mounting tab includes an orientation key and the mounting pocket includes a correspondingly shaped and sized notch to receive the orientation key when the blade insert is in the operable position.

15. A method of replacing a blade insert of a mower blade, the method comprising:
  slidably coupling the blade insert to a main body of the mower blade, wherein the main body and the blade insert present respective end faces with matching outer edges in an operable position, wherein one of the main body and the blade insert includes a mounting tab and the other of the main body and the blade insert includes a mounting pocket sized and shaped to receive the mounting tab, and wherein slidably coupling the blade insert to the main body includes sliding the mounting tab through an opening provided in the end face of the other of the main body and the blade insert and receiving the mounting tab in the mounting pocket, the opening being defined by a closed perimeter provided in the end face of the other of the main body and the blade insert,
  wherein slidably coupling the blade insert to the main body includes sliding the other one of the main body and the blade insert onto the mounting tab until the end face of the blade insert abuts the end face of the main body and restricts further sliding beyond the operable position; and
  removably securing the blade insert to the main body.

16. The method of claim 15 further comprising slidably coupling a second blade insert to the main body.

17. The method of claim 15 further comprising, during the slidably coupling the blade insert to the main body, axially aligning a fastener hole provided in the mounting tab with a through hole provided in the other of the main body and the blade insert.

18. The method of claim 17 further comprising extending a fastener through the through hole and engaging the fastener with the fastener hole.

19. The method of claim 18, wherein the fastener is a threaded bolt, and wherein the fastener hole is a threaded hole, the method further comprising threading the threaded bolt into the threaded hole to thereby removably secure the blade insert to the main body.

20. The method of claim 19, further comprising
  unthreading the threaded bolt from the threaded hole;
  slidably decoupling the blade insert from the main body;
  slidably coupling a replacement blade insert to the main body; and
threading the threaded bolt into the threaded hole to thereby removably secure the replacement blade insert to the main body.

* * * * *